United States Patent
Li

(10) Patent No.: US 11,515,134 B2
(45) Date of Patent: Nov. 29, 2022

(54) HIGHLY SENSITIVE EMITTER FOR STRONTIUM ISOTOPE ANALYSIS OF PICOGRAM-LEVEL SAMPLES BY THERMAL IONIZATION MASS SPECTROMETRY

(71) Applicant: Institute of Geology and Geophysics, Chinese Academy of Sciences, Beijing (CN)

(72) Inventor: Chaofeng Li, Beijing (CN)

(73) Assignee: Institute of Geology and Geophysics Chinese Academy of Sciences, Beijing (CN)

( * ) Notice: Subject to any disclaimer, the term of this patent is extended or adjusted under 35 U.S.C. 154(b) by 559 days.

(21) Appl. No.: 16/699,613

(22) Filed: Nov. 30, 2019

(65) Prior Publication Data

US 2020/0105514 A1    Apr. 2, 2020

(30) Foreign Application Priority Data

Feb. 27, 2019    (CN) .......................... 201910145620.7

(51) Int. Cl.
| | | |
|---|---|---|
| *H01J 49/00* | (2006.01) | |
| *B01D 15/36* | (2006.01) | |
| *H01J 49/16* | (2006.01) | |

(52) U.S. Cl.
    CPC ........ *H01J 49/0031* (2013.01); *B01D 15/362* (2013.01); *H01J 49/16* (2013.01)

(58) Field of Classification Search
    CPC ...... H01J 49/0031; H01J 49/16; H01J 49/041; H01J 9/042; B01D 15/362
    See application file for complete search history.

(56) References Cited

FOREIGN PATENT DOCUMENTS

CN    106198705 A  * 12/2016  ........... G01N 27/626

* cited by examiner

*Primary Examiner* — David E Smith
*Assistant Examiner* — Hsien C Tsai

(57) ABSTRACT

A method for strontium isotope analysis of picogram-level samples using highly sensitive silicotungstic acid emitter is presented by a thermal ionization mass spectrometry. The emitter has merits of extremely high sensitivity, low cost, simple operation, etc. It is an important innovation of the strontium isotope analysis of the picogram-level samples. Compared with a sample consumption of 1-50 ng of conventional emitter, the present invention only needs 30-200 pg to obtain satisfying measurement accuracy. The present invention greatly improves test sensitivity, and has broad application prospects in future.

16 Claims, No Drawings

HIGHLY SENSITIVE EMITTER FOR STRONTIUM ISOTOPE ANALYSIS OF PICOGRAM-LEVEL SAMPLES BY THERMAL IONIZATION MASS SPECTROMETRY

CROSS REFERENCE OF RELATED APPLICATION

The present invention claims priority under 35 U.S.C. 119(a-d) to CN 201910145620.7, filed Feb. 27, 2019.

BACKGROUND OF THE PRESENT INVENTION

Field of Invention

The present invention relates to a technical field of analytical chemistry, and more particularly to a method for strontium isotope analysis of picogram-level samples using a silicotungstic acid emitter.

Description of Related Arts

Strontium has four naturally occurring isotopes, $^{88}Sr$, $^{87}Sr$, $^{86}Sr$, and $^{84}Sr$, with abundances of 82.58%, 7.00%, 9.86% and 0.56%, respectively. Sr is widely distributed in various types of rocks, minerals, soils, water bodies and organisms in nature. Strontium isotope ratio varies greatly in different reservoirs in nature. It can be used for Rb—Sr isotope dating of common minerals (mica, feldspar, metal sulfides) in geological bodies, as well as for Sr isotope tracing of more extensive research objects (extraterrestrial materials, rock minerals, dusts, water bodies, foods, animals and plants, archaeological samples, etc.). Conventionally, the $^{87}Sr/^{86}Sr$ ratio as an isotopic indicator has been applied in environmental science, astrochemistry, isotope geochemistry, petrology, mineral deposits, archaeological science, food provenance authentication, criminal investigation science and other research fields.

Obtaining high-precision $^{87}Sr/^{86}Sr$ isotope ratio data is a prerequisite for the above researches. In the past few decades, thermal ionization mass spectrometry (TIMS) and multicollector inductively coupled plasma mass spectrometry (MC-ICP-MS) have been the main analytical instruments for obtaining high-precision $^{87}Sr/^{86}Sr$ ratio. Compared with TIMS analysis technology, MC-ICP-MS has higher analytical efficiency, but the memory effect of MC-ICP-MS instrument is relatively large, which is not suitable for Sr isotope analysis of picogram-level (<1 ng) samples. TIMS has lower memory effect, better selectivity and higher accuracy, so TIMS is regarded as the benchmark technology for Sr isotope ratio analysis of picogram-level samples.

One of the key points of Sr isotope analysis technology using TIMS is sample loading technology. The excellent emitter is the premise of high-precision Sr isotope analysis. The final analytical accuracy and sensitivity of Sr isotope analysis depends on emitters and filament materials employed. Since the 1960s, analytical chemists have developed a variety of emitters for Sr isotope analysis. Reported emitters has five types: 1) phosphoric acid; 2) a mixture of tantalum pentachloride ($TaCl_5$) and phosphoric acid; 3) a mixture of tantalum pentafluoride ($TaF_5$) and phosphoric acid; 4) a mixture of tantalum pentoxide ($Ta_2O_5$) and phosphoric acid; and 5) a mixture of silica gel and phosphoric acid. Among the above five emitters, the mixed emitter of tantalum pentafluoride ($TaF_5$) and phosphoric acid has the highest sensitivity, which can achieve high-precision Sr isotope data of even 1 ng-level sample size. Therefore, $TaF_5$ emitter is widely used in various research fields. However, for a sample size of 200 pg or less, since the $TaF_5$ emitter cannot provide good ionization efficiency of Sr, the sensitivity cannot meet the measurement requirements. Therefore, it is difficult to produce satisfactory data especially for very small sample size (<100 pg). The lack of Sr isotope analytical technology of picogram-level samples has greatly restricted the development of geoscience and environmental science. Especially, for some precious samples (extraterrestrial materials, single grain of mantle melt inclusions, biological shell microfossils) or samples with low strontium concentration (water samples, animal tissue samples and plant samples), it is difficult to provide sufficient samples, thus leading to the poor analytical precision of Sr isotope ratio In summary, no emitter has been developed for strontium isotope measurement of picogram-level (30 pg to 100 pg) samples. Therefore, the development of highly sensitive emitter for strontium isotope analysis techniques of picogram-level samples is urgent.

SUMMARY OF THE PRESENT INVENTION

A key object of the present invention is to provide a highly sensitive emitter for strontium isotope analysis of picogram-level samples, so as to improve the conventional thermal ionization mass spectrometry analysis techniques for strontium isotope.

Accordingly, in order to accomplish the above object, the present invention provides:

a method for strontium isotope analysis of a picogram-level sample, comprising a step of: using silicotungstic acid and phosphoric acid as a highly sensitive emitter for a thermal ionization mass spectrometry.

The method specifically comprises steps of:

I) loading the phosphoric acid onto the Re filament with high purity; after the phosphoric acid is evaporated to dryness at a low filament current (1.1 A), loading a silicotungstic acid emitter onto the Re filament; after the silicotungstic acid emitter is evaporated to dryness at a low current (1.1 A), loading the sample onto the Re filament and drying at a low filament current (1.1 A); then, increasing a filament current slowly until phosphoric acid is fumed away; following this, slowly heating the filament current to dull glow at about 2.3 A for 4 s; and II) using thermal ionization mass spectrometer for sample measurement.

A method for preparing and purifying the silicotungstic acid comprises steps of:

1) weighing silicotungstic acid powder into a Teflon® vail, and adding deionized water to dissolve the silicotungstic acid;

2) alternately cleaning an AG50W-X12 cation resin column with 30 mL 6M hydrochloric acid and 20 mL deionized water for purifying the silicotungstic acid in turn; and 3) passing silicotungstic acid solution through the AG50W-X12 cation resin column containing 1.5 mL of AG50W-X12 cation resin; wherein a potential ultra-trace amount of strontium and rubidium in the silicotungstic acid are eliminated by column purification, so as to reduce emitter background and eliminate isobaric interference from the ultra-trace amount of rubidium in the silicotungstic acid emitter.

According to the method, 1 µL 0.8M phosphoric acid and 1 µL silicotungstic acid are used as the emitter.

According to the method, in the step 1), 110±1 mg silicotungstic acid powder is weighed, and 5 mL high purity water is added; then the silicotungstic acid solution is further purified by the AG50W-X12 cation resin column.

According to the method, a particle size of silicotungstic acid powder is smaller than 200 mesh, and a purity of silicotungstic acid powder is better than 99.9%.

According to the method, the silicotungstic acid emitter is loaded onto the rhenium filament with the high purity.

According to the method, a purity of the rhenium filament is better than 99.8%.

According to the method, a temperature of the rhenium filament is 1360-1430° C.

The present invention also provides a highly sensitive emitter for strontium isotope analysis of a picogram-level sample by a thermal ionization mass spectrometry, comprising silicotungstic acid and phosphoric acid.

The principle of the present invention is as follows. The present invention uses the silicotungstic acid as the emitter, which can significantly improve the ionization efficiency of the strontium and reduce the sample size. There are five kinds of conventional ionizing emitters: phosphoric acid, silica gel+phosphoric acid, phosphoric acid+tantalum pentoxide, phosphoric acid+tantalum pentachloride, phosphoric acid+tantalum pentafluoride, and high-purity rhenium filament or tungsten filament as sample carrier. Among the above-mentioned emitters, the tantalum pentafluoride+ phosphoric acid mixed emitter exhibits the best sensitizing property. With Re ribbon as the sample carrier, even 1 ng-level samples can achieve good data. Conventional published emitters cannot provide high-intensity and stable Sr signal especially for ultra-low sample sizes (<0.2 ng), so analytical accuracy for picogram-level samples is poor. The present invention uses a new mixture of silicotungstic acid and phosphoric acid to replace the conventional emitter, and uses a high-purity rhenium filament as the sample carrier. During loading samples, the mixed emitter of the silicotungstic acid and the phosphoric acid is added to indirectly improve surface work content of the rhenium filament, which significantly enhances the ion yield of strontium, thereby greatly improving the analytical sensitivity of strontium. Compared with the conventional tantalum pentafluoride emitters, the silicotungstic acid significantly increases the ion yield of strontium from ~5% to ~16%.

Compared with the conventional techniques, the present invention has significant advantages as follows.

(1) The present invention significantly improves the ion yield of Sr during thermal ionization mass spectrometry measurement. The conventional techniques require a sample size of 1-50 ng, while the present invention requires a sample size of only 30-200 pg.

(2) The present invention is not corrosive and is an environmental friendly chemical reagent that is easy to prepare. Silicotungstic acid ($SiO_2 \cdot 12WO_3 \cdot 26H_2O$) is easily and quickly dissolved in ultra-pure water at room temperature without any further chemical treatment. However, prepare of $TaF_5$ emitter is complex. First, $Ta_2O_5$ powder with high purity (99.99%) is dissolved on a hot plate at about 120 degree using 22M of hydrofluoric acid which is extremely corrosive and toxic, creating significant safety issues. In addition, in order to ensure the excellent background of the $TaF_5$ emitter, the hydrofluoric acid must be purified using a special Teflon® double-bottle distiller. The purification process is time-consuming and risk. Hence, the whole preparation process of $TaF_5$ should be carefully carried out in a fume hood. (3) The present invention is easy to be purified by the most common cation resin column technique. Silicotungstic acid solution is further purified by passing through a AG50 cation resin column. On the contrary, the purification of the $TaF_5$ emitter is complex. The detailed Ta emitter recipe is documented by Charlie et al (Chem. Geol 2006, 32, 114-133), and this is widely used to determine Sr isotope ratios. According to their description, the $TaF_5$ solution, after $Ta_2O_5$ powder was dissolved using hydrofluoric acid, is first precipitated as a colloid $Ta(OH)_5$ by adding drops of ammonia solution. Then, the solution is centrifuged, and the supernatant liquid that contains any Rb and Sr contaminants, is poured off. The $Ta(OH)_5$ pellet is then re-suspended and centrifuged twice in distilled water, and the supernatant liquid discarded. The purified $Ta(OH)_5$ pellet is then dissolved again in 1 mL of hydrofluoric acid and the precipitation-centrifuge cycle repeated once again to obtain the final $TaF_5$ solution.

(4) The loading blank of the present invention is as low as 0.4-0.5 pg Sr each time, and does not cause contamination even small sample size. The method has the advantages of high sensitivity, green chemistry, low cost, convenient preparation and purification, etc., which is an important innovation of thermal ionization mass spectrometry technology, and has wide application prospecting future.

DETAILED DESCRIPTION OF THE PREFERRED EMBODIMENT

Referring to embodiments, the present invention will be further illustrated.

In the following embodiments, sources of the selected raw materials are:

premium grade pure silicotungstic acid (purity: 99.9%, Aladdin Chemistry Reagents Inc. (Shanghai, China)

ultrapure water (Millipore-Q element ultrapure water system, resistance >18.2MΩ/cm)

strontium isotope standard solution NIST 987 (U.S National Institute of Standards and Technology)

Embodiment 1

1. Emitter Preparation:
1) weighing 110±1 mg silicotungstic acid powder, and adding 5 mL ultrapure water;
2) after the silicotungstic acid powder is dissolved, passing silicotungstic acid solution through an AG50W-X12 cation resin column containing 1.5 mL to eliminate potential background interferences from emitter; and
3) preparing 0.8M phosphoric acid.

2. Loading Sample for TIMS Analysis

I) First, 1 μL of 0.8 M phosphoric acid and 1 μL of silicotungstic acid solution were loaded onto a degassed Re filament and dried at 1.1 A in sequence. Then, 1 μL of NIST987 solution containing 200 pg of Sr was loaded and dried at 1.1 A onto the Re filament. Finally, the filament current was slowly increased (~30 s) to 2.0 A and maintained at this current for 30 s. Then the current was increased slowly until phosphoric acid was fumed away. Following this, the filament current was slowly heated to a dull red glow at c.a 2.3 A for 4-6 seconds, then adjusting the filament current to zero; and II) All samples are measured by Triton Plus thermal ionization mass spectrometer. The $^{87}Sr/^{86}Sr$ ratio data were normalized to $^{88}Sr/^{86}Sr=8.375209$ for mass fractionation correction using the exponential law Every measurement run consisted of 300 cycles of data. The analytical result of 200 pg sample size of NIST987 is shown in Table 1.

TABLE 1 analysis result of 200 pg standard sample NIST 987

| Test number | $^{87}Sr/^{86}Sr$ | 2 SE |
|---|---|---|
| 1 | 0.710233 | 0.000015 |
| 2 | 0.710254 | 0.000014 |
| 3 | 0.710248 | 0.000015 |
| 4 | 0.71024 | 0.000015 |
| 5 | 0.710265 | 0.000014 |
| 6 | 0.710248 | 0.000015 |
| 7 | 0.710234 | 0.000015 |
| 8 | 0.710255 | 0.000014 |
| Mean ± 2 SD | 0.710247 | 0.000022 |

Embodiment 2

Embodiment 2 is substantially the same as the embodiment 1, except that 100 pg NIST 987 is loaded to test sensitivity and accuracy of the emitter. The analytical result of 100 pg sample size of NIST987 is shown in Table 2.

TABLE 2 analysis result of 100 pg standard sample NIST 987

| Test number | $^{87}Sr/^{86}Sr$ | 2 SE |
|---|---|---|
| 9 | 0.710248 | 0.000020 |
| 10 | 0.710237 | 0.000021 |
| 11 | 0.710268 | 0.000022 |
| 12 | 0.710248 | 0.000020 |
| 13 | 0.710245 | 0.000021 |
| 14 | 0.710214 | 0.000022 |
| 15 | 0.710265 | 0.000021 |
| 16 | 0.710239 | 0.000021 |
| Mean ± 2 SD | 0.710246 | 0.000034 |

Embodiment 3

Embodiment 3 is substantially the same as the embodiment 1, except that 50 pg NIST 987 is loaded to test sensitivity and accuracy of the emitter. The analytical result of 50 pg sample size of NIST987 is shown in Table 3.

TABLE 3 analysis result of 50 pg standard sample NIST 987

| Test number | $^{87}Sr/^{86}Sr$ | 2 SE |
|---|---|---|
| 17 | 0.710222 | 0.000041 |
| 18 | 0.710171 | 0.000039 |
| 19 | 0.710193 | 0.000041 |
| 20 | 0.710224 | 0.000038 |
| 21 | 0.710281 | 0.000041 |
| 22 | 0.710236 | 0.000039 |
| 23 | 0.710213 | 0.000041 |
| 24 | 0.710223 | 0.000041 |
| Mean ± 2 SD | 0.710220 | 0.000064 |

Embodiment 4

Embodiment 4 is substantially the same as the embodiment 1, except that 30 pg NIST 987 is loaded to test sensitivity and accuracy of the emitte. The analytical result of 50 pg sample size of NIST987 is shown in Table 4.

TABLE 4 analysis result of 30 pg standard sample NIST 987

| Test number | $^{87}Sr/^{86}Sr$ | 2 SE |
|---|---|---|
| 25 | 0.710305 | 0.000052 |
| 26 | 0.710218 | 0.000051 |
| 27 | 0.710155 | 0.000053 |
| 28 | 0.710165 | 0.000051 |
| 29 | 0.710202 | 0.000053 |
| 30 | 0.710225 | 0.000051 |
| 31 | 0.710179 | 0.000052 |
| 32 | 0.710217 | 0.000052 |
| Mean ± 2 SD | 0.710208 | 0.000094 |

Tables 1 to 4 list the analytical results for different loading size (200 pg, 100 pg, 50 pg, 30 pg) of the standard sample NIST 987 using the silicotungstic acid emitter. In case of 200 pg and 100 pg loading size, internal precision and external precision of the $^{87}Sr/^{86}Sr$ ratio was better than ±0.000022 (2 SE) and ±0.000035 (2 SD), respectively. As indicated in Table 1 and Table 2, the average value of 200 pg and 100 pg loads show excellent agreement with the reference value ($^{87}Sr/^{86}Sr$=0.710250±0.000030). As shown in Table 3 and Table 4, the external precision (2SD) and internal precision (2SE) of $^{87}Sr/^{86}Sr$ is about ±0.000064 and ±0.000042 for 50 pg loads, respectively, about ±0.000052 and ±0.000094, respectively. As shown in Tables 1, 2, 3 and 4, for NIST987 at 200 pg, 100 pg, 50 pg and 30 pg loads, the external precision obtained by 8 parallel analyses was better than ±0.000022, ±0.000034, ±0.000064 and ±0.000094, respectively.

It can be seen from above data that internal precision of $^{87}Sr/^{86}Sr$ isotopic ratios is better than ±0.000052 even with 30 pg loads. These data fully demonstrate that the proposed silicotungstic acid emitter has extremely high sensitivity and high accuracy for Sr isotope analysis.

To clarify the sensitizing effect of the silicotungstic acid emitter on picogram-level Sr samples, Table 5 lists the emission time and emission intensity of different sample loads. $^{88}Sr$ has the highest isotope abundance in the Sr isotope system, so $^{88}Sr$ signal intensity is used as a scale for sensitivity evaluation of silicotungstic acid. For example, in case of 200 pg loads, the intensity of $^{88}Sr$ can be kept for 2100-3200 mV over 30 minutes. Usually, the actual time of sample collection only takes 22 minutes and each run consists of 300 cycles of 4 s integration time to yield a good internal precision (<0.002%, 2RSE). In previous study, Chen et al. (Earth Science-Journal of China University of Geoscience, 2005, 30: 639-645) measured Sr isotope ratios of 500 pg loads using $TaF_5$ emitter, only about 2000 mV of $^{88}Sr$ signal and a short emission time were obtained that yielded an analytical internal precision (±0.003%, 2 RSE) for 500 pg sample loads. As shown in Table 2, the same analytical precision can be obtained in 100 pg loads using silicotungstic acid emitter. In contrast with $TaF_5$ emitter, we reduce 5-fold sample consumption employing using silicotungstic acid emitter. For 100 pg loads with the silicotungstic acid emitter, the intensity of $^{88}Sr$ was 900-1400 mV and the emission time was longer than 22 minutes. For 50 pg loads with the silicotungstic acid emitter, the intensity of $^{88}Sr$ was 380-600 mV and the emission time was longer than 22 minutes.

TABLE 5

Signal intensity of $^{88}$Sr for different sample loads using silicotungstic acid emitter

| Sample size (pg) | $^{88}$Sr (mV) | Emission time (min) |
|---|---|---|
| 200 | 2100~3200 | >30 |
| 100 | 900~1400 | >24 |
| 50 | 380~600 | >22 |
| 30 | 250~350 | >22 |

It is to be understood that those skilled in the art will be able to make modifications and changes in accordance with the above description, and all such modifications and changes are intended to be included within the scope of the appended claims.

What is claimed is:

1. A method for strontium isotope analysis of a picogram-level sample, comprising a step of: using silicotungstic acid and phosphoric acid as a highly sensitive emitter for a thermal ionization mass spectrometry.

2. The method, as recited in claim 1, specifically comprising steps of:
   I) loading the phosphoric acid onto a Re filament with high purity; after the phosphoric acid is evaporated to dryness, loading a silicotungstic acid emitter onto the Re filament with the high-purity; after the silicotungstic acid emitter is evaporated to dryness, loading the sample onto the Re filament and evaporating to dryness; increasing a filament current until the Re filament turns dark red for 4-6 seconds, then tuning the filament current to zero; and
   II) measuring the sample by the thermal ionization mass spectrometer.

3. The method, as recited in claim 1, wherein a method for preparing and purifying the silicotungstic acid comprises steps of:
   1) weighing silicotungstic acid powder into a Teflon® vial, and adding high-purity water to dissolve the silicotungstic acid powder;
   2) prewashing an AG50W-X12 cation resin column with 30 mL 6M hydrochloric acid and 20 mL deionized water in turn; and
   3) passing silicotungstic acid solution through the AG50 cation resin column containing 1.5 mL of AG50W-X12 resin; wherein a trace amount of strontium and rubidium in the silicotungstic acid are eliminated by column purification technique in order to reduce emitter loading blank of emitter and eliminate potential $^{87}$Rb isobaric interference of the emitter.

4. The method, as recited in claim 2, wherein a method for preparing and purifying the silicotungstic acid comprises steps of:
   1) weighing silicotungstic acid powder into a Teflon® vial, and adding high purity water to dissolve the silicotungstic acid powder;
   2) prewashing a AG50W-X12 cation resin column with 30 mL 6M hydrochloric acid and 20 mL high purity water in turn; and
   3) passing silicotungstic acid solution through the AG50W-X12 cation resin column containing 1.5 mL of AG50W-X12 cation resin; wherein a trace amount of strontium and rubidium in the silicotungstic acid are eliminated by column purification technique in order to reduce loading blank of emitter and eliminate potential $^{87}$Rb isobaric interference of the emitter.

5. The method, as recited in claim 2, wherein 1 µL 0.8M phosphoric acid and 1 µL silicotungstic acid are used as the emitter.

6. The method, as recited in claim 3, wherein in the step 1), 110±1 mg silicotungstic acid powder is weighed, and 5 mL high-purity water is added; then the silicotungstic acid solution is further purified by the AG50W-X12 cation resin column.

7. The method, as recited in claim 4, wherein in the step 1), 110±1 mg silicotungstic acid powder is weighed, and 5 mL high-purity water is added; then the silicotungstic acid solution is further purified by the AG50W-X12 cation resin column.

8. The method, as recited in claim 3, wherein a particle size of the silicotungstic acid powder is better than 200 mesh, and a purity of the silicotungstic acid powder is higher than 99.9%.

9. The method, as recited in claim 4, wherein a particle size of the silicotungstic acid powder is better than 200 mesh, and a purity of the silicotungstic acid powder is higher than 99.9%.

10. The method, as recited in claim 3, wherein the silicotungstic acid emitter is loaded onto the Re filament with the high purity.

11. The method, as recited in claim 4, wherein the silicotungstic acid emitter is loaded onto the Re filament with the high purity.

12. The method, as recited in claim 3, wherein a purity of the rhenium filament is higher than 99.8%.

13. The method, as recited in claim 4, wherein a purity of the rhenium filament is higher than 99.8%.

14. The method, as recited in claim 3, wherein a temperature of the rhenium filament is 1360-1430° C.

15. The method, as recited in claim 4, wherein a temperature of the rhenium filament is 1360-1430° C.

16. A highly sensitive emitter for strontium isotope analysis of a picogram-level sample by a thermal ionization mass spectrometry, comprising silicotungstic acid and phosphoric acid.

* * * * *